United States Patent
Toriumi et al.

(10) Patent No.: US 8,453,699 B2
(45) Date of Patent: Jun. 4, 2013

(54) METHOD OF AND APPARATUS FOR MOLDING GLAZING GASKET ONTO MULTIPLAYER GLASS PANEL

(75) Inventors: Shuichi Toriumi, Hiratsuka (JP); Yousuke Hamachi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/377,089

(22) PCT Filed: Jun. 9, 2009

(86) PCT No.: PCT/JP2009/060818
§ 371 (c)(1),
(2), (4) Date: Jan. 12, 2012

(87) PCT Pub. No.: WO2010/143309
PCT Pub. Date: Dec. 16, 2010

(65) Prior Publication Data
US 2012/0138212 A1 Jun. 7, 2012

(51) Int. Cl.
*B29C 47/06* (2006.01)
(52) U.S. Cl.
USPC ............. 156/500; 156/99; 156/107; 156/109; 156/244.11; 156/244.23; 264/252; 264/279; 425/145; 425/382.3; 425/382.4
(58) Field of Classification Search
USPC .......... 156/107, 109, 244.11, 244.23, 244.25; 264/252, 279, 279.1; 425/145, 146, 147, 425/382.3, 382.4
See application file for complete search history.

(56) References Cited

U.S. PATENT DOCUMENTS

| | | | | |
|---|---|---|---|---|
| 3,745,200 A | * | 7/1973 | Geyer | 264/37.26 |
| 4,973,436 A | * | 11/1990 | Lisec | 264/40.1 |
| 5,108,526 A | * | 4/1992 | Cornils et al. | 156/108 |
| 5,273,704 A | | 12/1993 | Scholl et al. | |
| 5,336,349 A | | 8/1994 | Cornils et al. | |
| 5,382,395 A | * | 1/1995 | Hoenke | 264/40.7 |
| 5,554,325 A | * | 9/1996 | Kotte et al. | 264/37.26 |
| 5,645,667 A | * | 7/1997 | Kusen | 156/108 |

FOREIGN PATENT DOCUMENTS

| | | |
|---|---|---|
| JP | 7291678 | 11/1995 |
| JP | 2009137209 | 6/2009 |

OTHER PUBLICATIONS

PCT application PCT/JP2009/060818; filed Sep. 8, 2009; Shuichi Toriumi; International Search Report mailed Sep. 8, 2009.

*Primary Examiner* — William Bell
(74) *Attorney, Agent, or Firm* — Thorpe North & Western LLP

(57) ABSTRACT

A molding material 22 from an extruding machine 33 is fed by a molding material feed pump 34 to a molding material discharge pump 32, which discharges the molding material from a coating gun 31 to a peripheral edge portion 21a of a multilayer glass panel 21. The rate at which the molding material 22 is discharged from the coating gun 31 is adjusted by controlling the rotational speed of the molding material discharge pump 32 depending on the relative speed between the multilayer glass panel 21 and the coating gun 31. An amount of molding material 22, which is commensurate with the difference between the rates at which the molding material 22 is fed to and drawn into the molding material discharge pump 32, is circulated through a flexible circulation hose 39 to the extruding machine 33.

20 Claims, 4 Drawing Sheets

U.S. PATENT DOCUMENTS

| | | | | |
|---|---|---|---|---|
| 5,807,588 A * | 9/1998 | Todaka et al. | | 425/113 |
| 5,914,083 A * | 6/1999 | Yada et al. | | 264/259 |
| 7,819,999 B2 * | 10/2010 | Watanabe et al. | | 156/107 |
| 2003/0064124 A1 * | 4/2003 | Comb | | 425/145 |
| 2004/0247731 A1 * | 12/2004 | Kobayashi | | 425/381 |
| 2009/0301637 A1 * | 12/2009 | Reichert | | 156/109 |

* cited by examiner

METHOD OF AND APPARATUS FOR MOLDING GLAZING GASKET ONTO MULTIPLAYER GLASS PANEL

TECHNICAL FIELD

The present invention relates to a method of and an apparatus for molding a glazing gasket onto a multilayer glass panel, and more particularly to a method of and an apparatus for molding a glazing gasket onto a multilayer glass panel by directly coating the multilayer glass panel with a molding material such as a highly viscous thermoplastic elastomer.

BACKGROUND ART

Generally, multilayer glass panels comprise two glass panes and a spacer interposed between the two glass panes to provide an air layer therebetween. Since the multilayer glass panels thus constructed have an excellent thermal insulation capability, they serve as an energy saver when used in combination with housing and building sashes.

According to a most typical process of installing a multilayer glass panel into a sash, a continuous channel-shaped glazing gasket is extruded and cut into lengths that match the vertical and horizontal dimensions of a multilayer glass panel. The glazing gasket lengths are then fitted over the vertical and horizontal edges of the multilayer glass panel, and the vertical and horizontal edges of the multilayer glass panel which are covered with the glazing gasket lengths are inserted into the corresponding grooves of a sash. In this manner, the multilayer glass panel is installed in the sash.

The above process of mounting the glazing gasket on the multilayer glass panel is tedious and time-consuming and is of low productivity because the glazing gasket is manually fitted over the edges of the multilayer glass panel.

For increased productivity, there has recently been proposed a method of molding a glazing gasket onto a multilayer glass panel by extruding a molding material directly onto the peripheral edges of the multilayer glass panel with molding dies which are connected to an extruding machine and shot pumps, as disclosed in WO2006/046349.

A process of molding a glazing gasket onto a multilayer glass panel according to the background art will be described below with reference to FIG. 4 of the accompanying drawings.

FIG. 4 schematically shows in side elevation an apparatus for molding a glazing gasket onto a multilayer glass panel by coating the multilayer glass panel with a molding material. As shown in FIG. 4, the apparatus comprises an extruding machine 1 for melting and extruding a molding material in the form of pellets of thermoplastic resin, a pair of shot pumps 4a, 4b for delivering the melted molding material from the extruding machine 1, the shot pumps 4a, 4b being connected to a molding material outlet of the extruding machine 1 by a molding material supply pipe 2 and a valve 3, a pair of coating guns 6a, 6b for simultaneously applying a layer of adhesive and a layer of molding material to the multilayer glass panel, the coating guns 6a, 6b being connected to respective molding material outlets of the shot pumps 4a, 4b through respective flexible heatable molding material supply pipes 5a, 5b, a pair of shot pumps 8a, 8b for delivering an adhesive which are connected to the coating guns 6a, 6b through respective flexible heatable adhesive supply pipes 7a, 7b, and an adhesive supply pump 11 connected to the shot pumps 8a, 8b by an adhesive supply pipe 9 and a valve 10.

Operation of the apparatus shown in FIG. 4 for coating a multilayer glass panel with a molding material to mold glazing gaskets on the multilayer glass panel will be described below. As shown in FIG. 5 of the accompanying drawings, a multilayer glass panel 21 to be coated with a molding material has its plane oriented vertically and is placed on and held by a support base 13. Of two coating guns 6a, 6b for coating the multilayer glass panel 21 with a molding material, one of the coating guns 6a is disposed closely to the face side of a peripheral edge portion 21a of the multilayer glass panel 21, and the other coating gun 6b is disposed closely to the back side of the peripheral edge portion 21a of the multilayer glass panel 21.

A predetermined amount of melted molding material is supplied from the extruding machine 1 through the molding material supply pipe 2 and the valve 3 to the shot pumps 4a, 4b, and temporarily stored in the shot pumps 4a, 4b. At the same time, a predetermined amount of melted hot-melt adhesive is supplied from adhesive supply pump 11 through the adhesive supply pipe 9 and the valve 10 to the shot pumps 8a, 8b, and temporarily stored in the shot pumps 8a, 8b. Then, the valve 10 is closed and the shot pumps 8a, 8b are actuated to deliver the adhesive stored in the shot pumps 8a, 8b under pressure through the adhesive supply pipes 7a, 7b to the coating guns 6a, 6b. The coating guns 6a, 6b then discharge the supplied adhesive to the face and back surfaces of the peripheral edge portion 21a of the multilayer glass panel 21, thereby coating the face and back surfaces of the peripheral edge portion 21a with respective layers of adhesive. At the same time, the valve 3 is closed and the shot pumps 4a, 4b are actuated to deliver the molding material stored in the shot pumps 4a, 4b under pressure through the molding material supply pipes 5a, 5b to the coating guns 6a, 6b. The coating guns 6a, 6b then discharge the supplied molding material to applied layers of adhesive on the face and back surfaces of the peripheral edge portion 21a of the multilayer glass panel 21, thereby coating the applied layers of adhesive on the face and back surfaces of the peripheral edge portion 21a with respective layers of molding material. One or both of the coating guns 6a, 6b and the multilayer glass panel 21 are moved relatively to each other by a feed mechanism, not shown, so that the coating guns 6a, 6b are continuously displaced along the peripheral edge 12a of the multilayer glass panel 21. The layers 4 of the melted hot-melt adhesive and the layers 5 of the melted molding material are thus continuously applied to the face and back surfaces of the peripheral edge portion 21a of the multilayer glass panel 21, forming glazing gaskets thereon.

DISCLOSURE OF THE INVENTION

Problems to be Solved by the Invention

The molding material is usually a thermoplastic elastomer such as of olefin, polyester, polyamide, or the like. The molding material needs to be melted at a temperature of about 180° C. for making the thermoplastic elastomer viscous enough to be directly applied to the multilayer glass panel to mold a glazing gasket thereon.

However, the molding material that is melted at the temperature of about 180° C. is still highly viscous and not flowable enough in the supply pipes. When the shot pumps 4a, 4b are actuated, the melted molding material is discharged with a time lag from the coating guns 6a, 6b toward the multilayer glass panel 21. As a result, the multilayer glass panel 21 cannot be coated quickly and highly accurately with the molding material. The reasons for the above shortcoming are that the shot pumps 4a, 4b are used to deliver the melted molding material to the coating guns 6a, 6b and the molding material supply pipes 5a, 5b interconnecting the coating guns 6a, 6b and the shot pumps 4a, 4b have a large length of few meters, e.g., two meters.

Even when servomotors used to actuate the shot pumps 4a, 4b are controlled in their rotational speeds to regulate the rate at which the melted molding material is delivered to the coating guns 6a, 6b, since the molding material is highly viscous and compressible, and the molding material supply pipes 5a, 5b are relatively long, there is still an inevitable time difference between the actuation of the shot pumps 4a, 4b and the discharge of the molding material from the coating guns 6a, 6b. The inevitable time difference is responsible for a failure to accurately control the amount of molding material discharged from the coating guns 6a, 6a and irregularities in the thickness and amount of molding material applied to the multilayer glass panel 21. As a result, glazing gaskets of highly accuracy cannot be molded on the multilayer glass panel 21, and the molding material cannot be applied at a high rate to the multilayer glass panel 21.

It is an object of the present invention to provide a method of and an apparatus for molding a glazing gasket onto a multilayer glass panel by applying a highly viscous molding material highly accurately at a high rate while controlling the amount of melted molding material from a coating gun depending on the rate at which the multilayer glass panel is coated with the molding material.

According to an aspect of the present invention, there is provided a method of molding a glazing gasket onto a multilayer glass panel by applying a molding material discharged from a coating gun as a layer of molding material to a peripheral edge portion of the multilayer glass panel while the multilayer glass panel and the coating gun are being moved relatively to each other along peripheral edge portion of the multilayer glass panel, comprising the steps of providing a molding material discharge pump connected to the coating gun for discharging the molding material from the coating gun, an extruding machine for extruding the molding material, and a molding material feed pump for feeding the molding material extruded from the extruding machine to the molding material discharge pump, providing a circulation path connected between the molding material discharge pump and the extruding machine or between the molding material discharge pump and the molding material feed pump, feeding the molding material extruded from the extruding machine to the molding material discharge pump with the molding material feed pump, drawing the molding material into the molding material discharge pump, supplying the molding material from the molding material discharge pump to the coating gun under constant pressure, and adjusting the rate at which the molding material is discharged from the coating gun depending on the relative speed at which the multilayer glass panel and the coating gun are moved relatively to each other, and circulating an amount of molding material through the circulation path to the extruding machine or the molding material feed pump, the amount of molding material being commensurate with the difference between a first rate at which the molding material is fed from the molding material feed pump to the molding material discharge pump and a second rate at which the molding material is drawn into the molding material discharge pump when the first rate is greater than the second rate.

According to an aspect of the present invention, there is provided an apparatus for molding a glazing gasket onto a multilayer glass panel by applying a molding material discharged from a coating gun as a layer of molding material to a peripheral edge portion of the multilayer glass panel while the multilayer glass panel and the coating gun are being moved relatively to each other along peripheral edge portion of the multilayer glass panel, comprising a molding material discharge pump connected to the coating gun for discharging the molding material from the coating gun, an extruding machine for extruding the molding material, a molding material feed pump for feeding the molding material extruded from the extruding machine to the molding material discharge pump, control means for adjusting the rate at which the molding material is discharged from the coating gun by controlling the rotational speed of the molding material discharge pump depending on the relative speed at which the multilayer glass panel and the coating gun are moved relatively to each other, and a circulation path connected between the molding material discharge pump and the extruding machine or between the molding material discharge pump and the molding material feed pump, wherein an amount of molding material is circulated through the circulation path to the extruding machine or the molding material feed pump, the amount of molding material being commensurate with the difference between a first rate at which the molding material is fed from the molding material feed pump to the molding material discharge pump and a second rate at which the molding material is drawn into the molding material discharge pump when the first rate is greater than the second rate.

With the method of and the apparatus for molding a glazing gasket onto a glass panel according to the present invention, the molding material extruded from the extruding machine is supplied at a constant rate from the molding material feed pump to the molding material discharge pump, which draws in and supplies the molding material under a constant pressure to the coating gun. The coating gun discharges the molding material to the peripheral edge portion of the multilayer glass panel to coat the peripheral edge portion with the molding material. The rate at which the molding material is discharged from the coating gun is adjusted by controlling the rotational speed of the molding material discharge pump depending on the relative speed at which the multilayer glass panel and the coating gun are moved relatively to each other while the glazing gasket molding apparatus is in operation. When the rate at which the molding material is supplied from the molding material feed pump to the molding material discharge pump becomes greater than the rate at which the molding material is drawn into the molding material discharge pump, the difference between these rates results in an excessive amount of molding material circulating from the molding material discharge pump through the circulation path back into the extruding machine or the molding material feed pump. Even though the molding material is highly viscous and compressible, and a feed path extending from the molding material feed pump to the molding material discharge pump is long, and even when the molding material discharge pump is not in operation, the molding material is caused to flow at all times from the molding material feed pump toward the molding material discharge pump. Thus, the pressure of the molding material at the inlet end of the molding material discharge pump can be held at a constant level at all times. The highly viscous molding material can be applied at a high rate to the multilayer glass panel, and the apparatus can quickly start to operate to apply the molding material to the multilayer glass panel. Furthermore, inasmuch as the rotational speed of the molding material discharge pump is controlled depending on the relative speed between the multilayer glass panel and the coating gun, the rate at which the molding material is discharged from the coating gun can be adjusted highly accurately. Consequently, a glazing gasket can be molded highly accurately to a constant thickness on the multilayer glass panel, and can also be molded automatically on the multilayer glass panel.

Moreover, when the molding material is circulated back to the extruding machine or the molding material feed pump, the rate at which the molding material is extruded from the extruding machine may be controlled depending on the rate at which the molding material is circulated, so that the molding material can be circulated through at a constant rate the circulation path.

BEST MODE FOR CARRYING OUT THE INVENTION

A glazing gasket molding apparatus according to an embodiment of the present invention, which carries out a method of molding a glazing gasket onto a multilayer glass panel according to the present invention, will be described in detail below with reference to the drawings. The principles of the present invention should not be construed as being limited to the glazing gasket molding apparatus and the method carried out thereby which are illustrated in the embodiment of the present invention.

Figure 1:
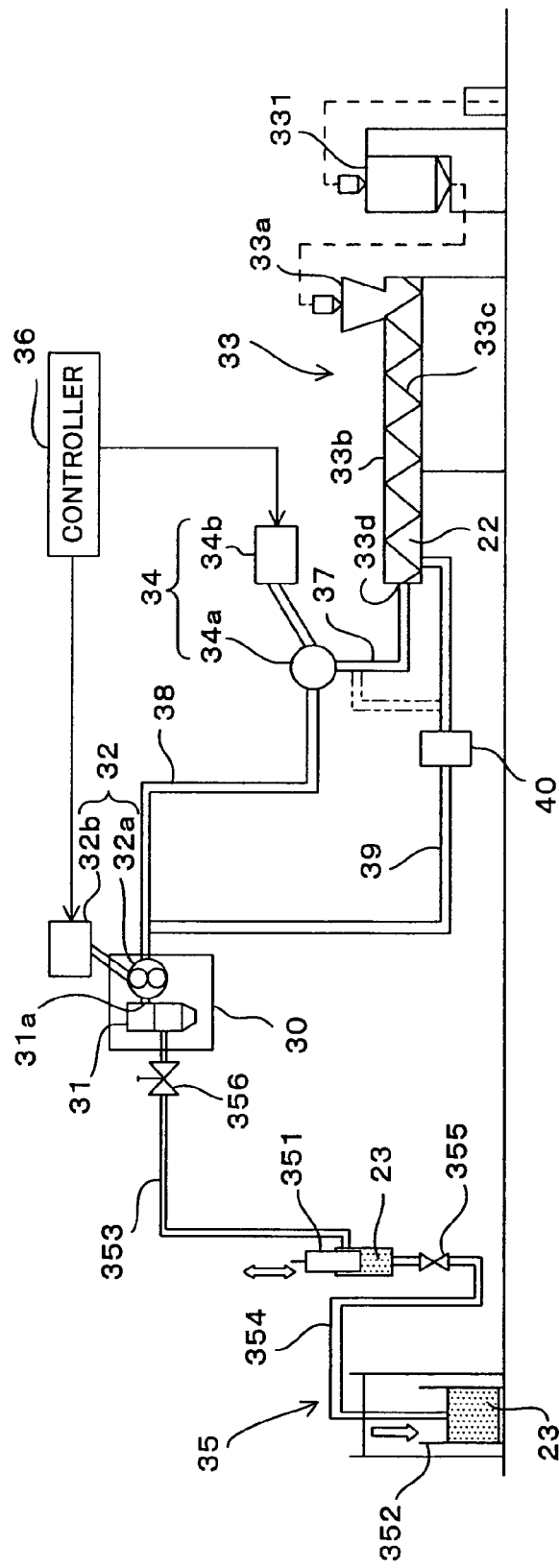
FIG. 1 is a schematic side elevational view of a glazing gasket molding apparatus according to an embodiment of the present invention, which carries out a method of molding a glazing gasket onto a multilayer glass panel according to the present invention.
Figure 2:
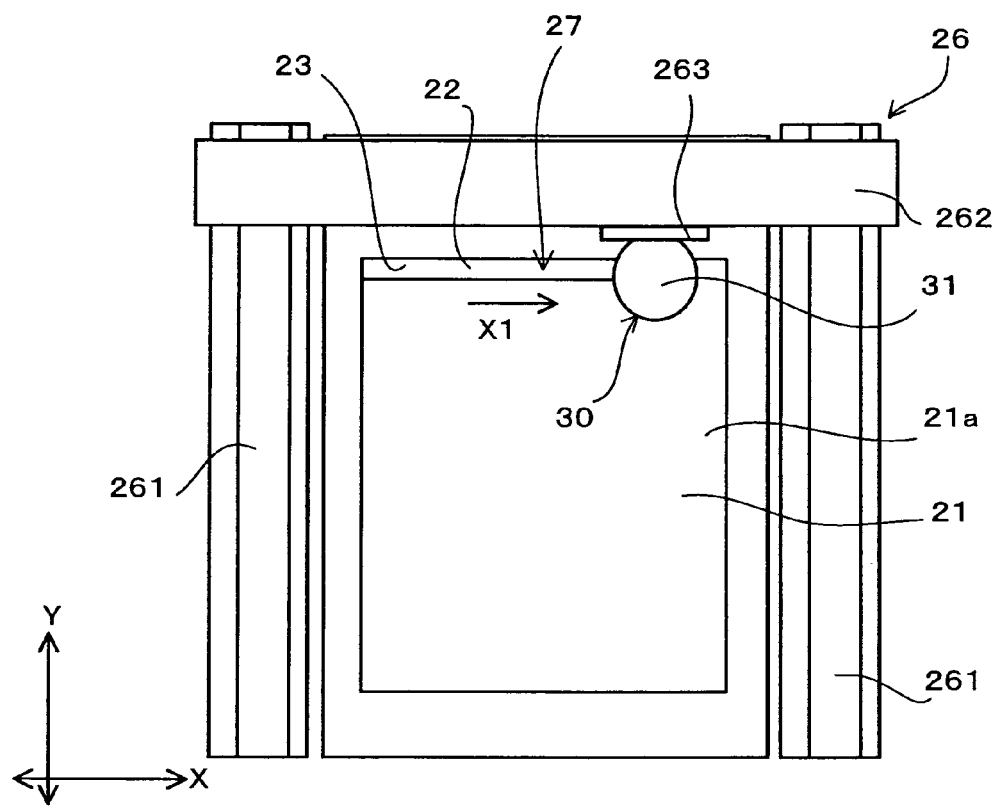
FIG. 2 is a plan view showing the positional relationship between a robot with a coating gun and a multilayer glass panel and also showing the manner in which the glazing gasket molding apparatus operates to mold a glazing glass according to the embodiment of the present invention.
Figure 3:
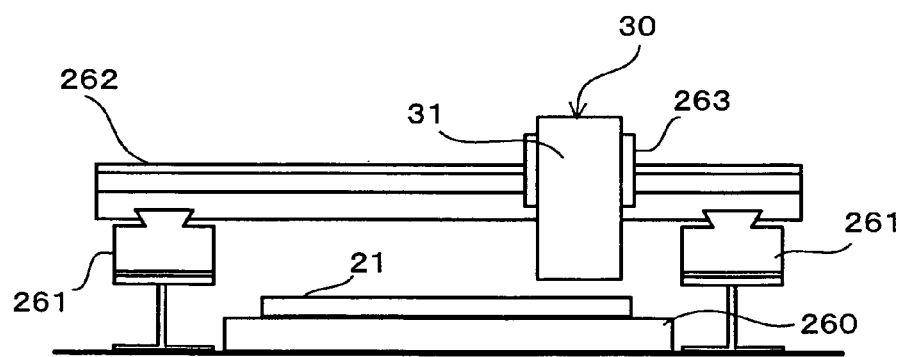
FIG. 3 is a front elevational view of the robot with the coating gun and the multilayer glass panel shown in FIG. 2.
Figure 4:
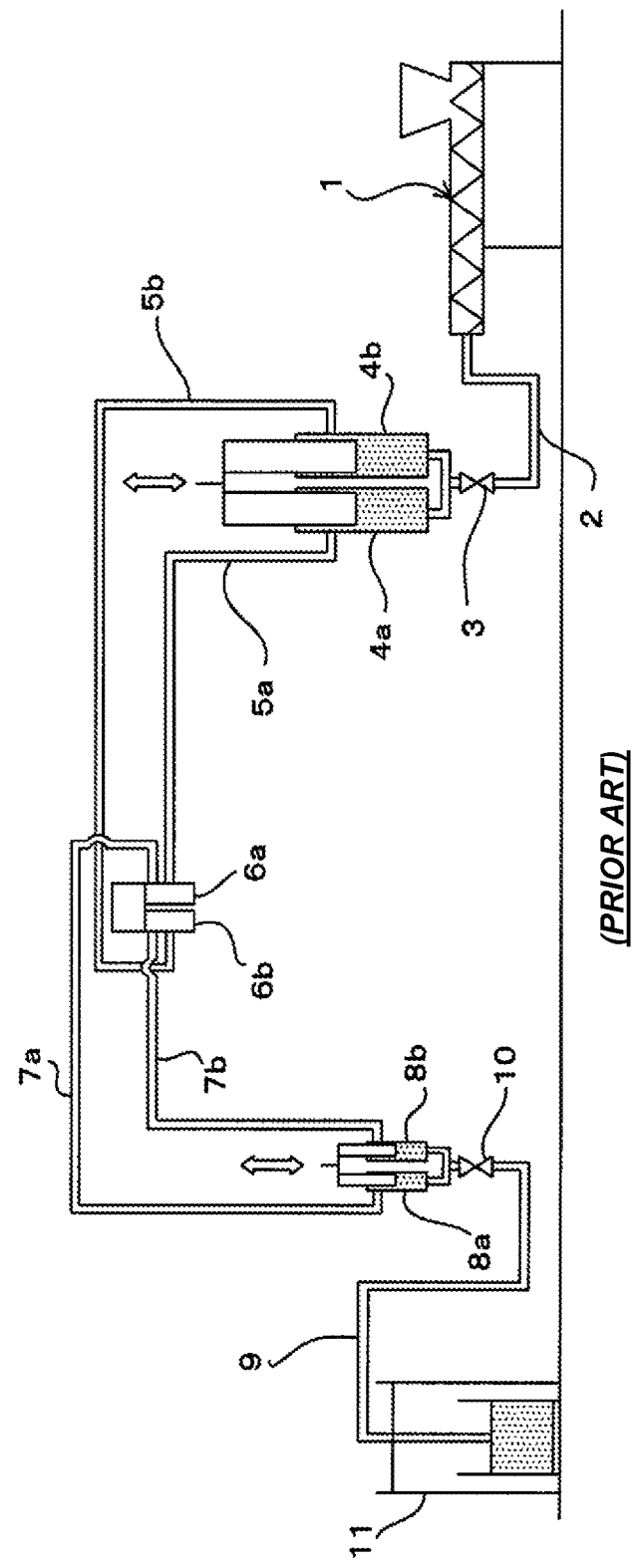
FIG. 4 is a schematic side elevational view of a glazing gasket molding apparatus according to the background art.
Figure 5:
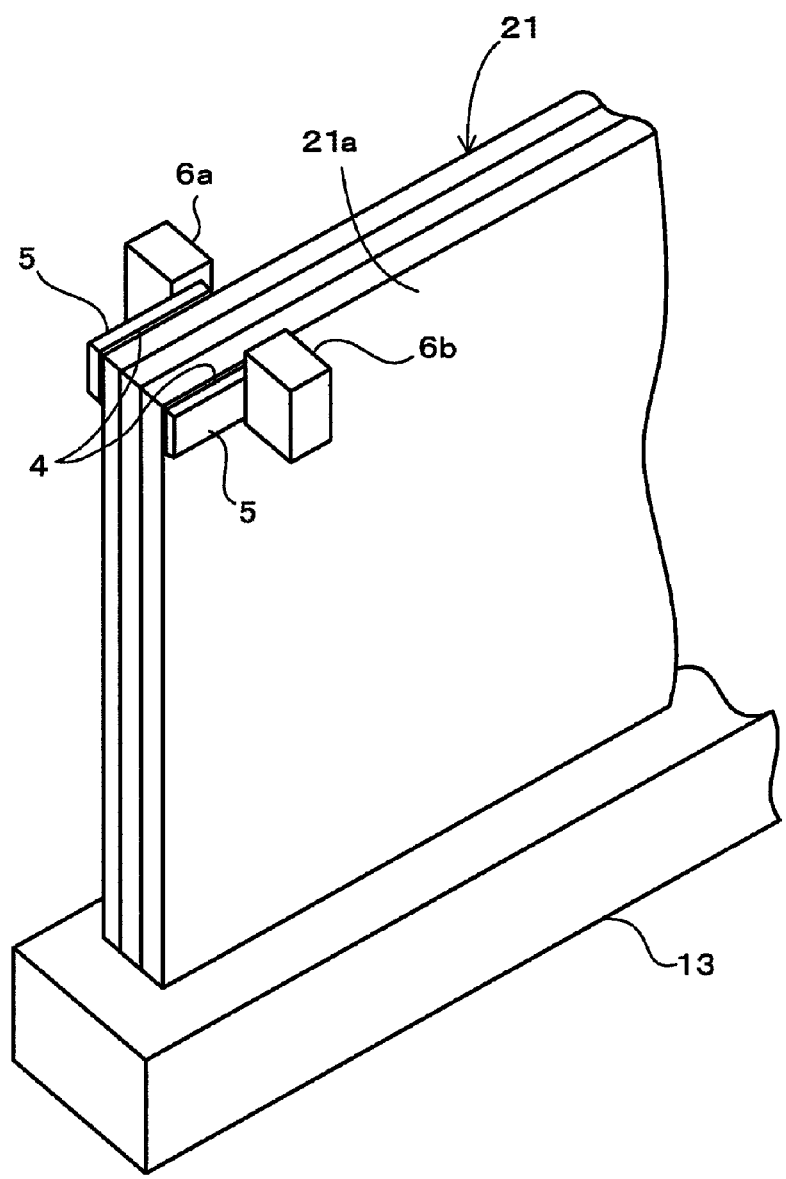
FIG. 5 is a fragmentary perspective view showing the manner in which a glazing gasket is molded onto a multilayer glass panel according to the background art.

As shown in FIG. 1, the glazing gasket molding apparatus includes a coating gun 31 for applying a molding material 22 and a hot-melt adhesive 23 in two layers to the face or back surface of a peripheral edge portion 21a of a multilayer glass panel 21 shown in FIGS. 2 and 3, a molding material discharge pump 32 for discharging the molding material from the coating gun 31, an extruding machine 33 for melting and extruding the molding material 22, a molding material feed pump 34 for continuously feeding the molding material extruded from the extruding machine 33 at a constant rate to the molding material discharge pump 32, and an adhesive supply mechanism 35 for supplying the adhesive 23 to the coating gun 31.

The coating gun 31 and the molding material discharge pump 32 are integrally combined with each other in a head body 30. The molding material discharge pump 32 comprises a gear pump 32a having an outlet port connected to the coating gun 31 by a short passage 31a. The gear pump 32a is actuatable by a servomotor 32b which is operatively coupled to the gear pump 32a. The rotational speed of the servomotor 32b and hence the gear pump 32a is controlled by a controller 36 depending on the relative speed at which the multilayer glass panel 21 and the coating gun 31 are moved relatively to each other while the glazing gasket molding apparatus is in operation.

The molding material feed pump 34 comprises a trochoidal pump 34a that is actuatable by a servomotor 34b which is operatively coupled to the trochoidal pump 34a. The servomotor 34b is controlled by the controller 36 to rotate at a constant rotational speed to feed the molding material at a constant rate from the trochoidal pump 34a to the molding material discharge pump 32.

The extruding machine 33 comprises a hopper 33a, a heating cylinder 33b having an end connected to the hopper 33a and an outlet end 33d remote from the hopper 33a, and a screw 33c rotatably disposed in the heating cylinder 33b. The extruding machine 33 is combined with a resin dryer 331 for drying, with heat, the molding material 22 that is in the form of pellets or a powder and supplying the dried molding material 22 to the hopper 33a. The dried molding material 22 that is supplied from the resin dryer 331 to the hopper 33a is delivered by the screw 33a through the heating cylinder 33b to the outlet end 33d, during which time the molding material 22 is melted with heat by the heating cylinder 33b. The melted molding material 22 can be applied to the multilayer glass panel 21 by the coating gun 31.

The outlet end 33d of the heating cylinder 33b is connected to an inlet end of the molding material feed pump 34, i.e., the trochoidal pump 34a, by a flexible pressure-resistant hose 37 with a built-in heater. The hose flexible pressure-resistant 37 is heated to a high temperature by the built-in heater during operation. The trochoidal pump 34a has an outlet end connected to an inlet end of the molding material discharge pump 32, i.e., the gear pump 32a, by a flexible pressure-resistant hose 38 with a built-in heater. The flexible pressure-resistant hose 38 is heated to a high temperature by the built-in heater during operation.

The portion of the flexible pressure-resistant hose 38 which is near the inlet end of the gear pump 32a is connected to the outlet end 33d of the heating cylinder 33b by a flexible pressure-resistant circulation hose 39 with a built-in heater. The flexible pressure-resistant circulation hose 39, which corresponds to a circulation path as claimed, is heated to a high temperature by the built-in heater during operation. The flexible pressure-resistant circulation hose 39 has a check valve 40 for preventing the molding material 22 extruded from the extruding machine 33 from flowing through the flexible pressure-resistant circulation hose 39 into the inlet end of the molding material discharge pump 32.

The adhesive supply mechanism 35 comprises a shot pump 351 for supplying the adhesive 23 to the coating gun 31 and forcing the adhesive 23 to be discharged from the coating gun 31, and an adhesive supply pump 352 for supplying the adhesive 23 to the shot pump 351. The coating gun 31 is connected to an outlet end of the shot pump 351 by a flexible hose 353 with a built-in heater. The flexible hose 353 is heated by the built-in heater for heating and melting the adhesive 23 flowing therein so that the adhesive 23 can be applied to the multilayer glass panel 21 by the coating gun 31. The flexible hose 353 has an on-off valve 356 near the coating gun 31. The shot pump 351 and the adhesive supply pump 352 are connected to each other by a flexible hose 354 with a built-in heater. The flexible hose 354 is heated by the built-in heater for heating and melting the adhesive 23. The flexible hose 354 also has an on-off valve 355.

The head body 30 is mounted on a robot 26 for molding a glazing gasket.

As shown in FIGS. 2 and 3, the robot 26 includes a pair of guide rails 261 disposed in respective mutually confronting positions on opposite sides of a worktable 260 and extending parallel to each other in the direction indicated by the arrow Y, a Y-axis slide 262 movably mounted on the guide rails 261 and extending perpendicularly between the guide rails 261, the Y-axis slide 262 being movable in a horizontal plane on and along the guide rails 261 in the directions indicated by the arrow Y, and an X-axis slide 263 movably mounted on the Y-axis slide 262 and movable in a horizontal plane on and along the Y-axis slide 262 in the directions indicated by the arrow X which are perpendicular to the directions in which the Y-axis slide 262 is movable. The head body 30 is mounted on the X-axis slide 263.

The Y-axis slide 262 incorporates therein an actuator such as a servomotor or the like for automatically moving the Y-axis slide 262 in the directions indicated by the arrow Y. Similarly, the X-axis slide 263 incorporates therein an actuator such as a servomotor or the like for automatically moving the X-axis slide 263 in the directions indicated by the arrow X.

Operation of the glazing gasket molding apparatus for molding a glazing gasket onto a multilayer glass panel will be described below.

First, the multilayer glass panel 21 which is free of any glazing gaskets is horizontally placed, positioned, and clamped on the worktable 260, with a face surface of the multilayer glass panel 21 facing upwardly to the head body 30, as shown in FIGS. 2 and 3. The Y-axis slide 262 and the X-axis slide 263 of the robot 26 are moved in the directions indicated by the arrows Y, X in a plane parallel to the worktable 260 to position the coating gun 31 in the head body 30 at a start position which faces a peripheral edge portion of the multilayer glass panel 21.

Then, the melted molding material 22 extruded from the extruding machine 33 is supplied through the flexible pressure-resistant hose 37 to the molding material feed pump 34. The controller 36 energizes the servomotor 34b to actuate the trochoidal pump 34a to supply the melted molding material 22 at a constant rate through the flexible pressure-resistant hose 37 to the molding material discharge pump 32.

At the same time that the melted molding material 22 is supplied to the molding material discharge pump 32, the adhesive supply pump 352 is actuated to supply a predetermined amount of hot-melt adhesive 23 through the flexible hose 354 and the on-off valve 355 to the shot pump 351, which temporarily stores the supplied adhesive 23. Then, the on-off valve 355 is closed and the shot pump 351 is actuated to preload the adhesive 23 in the shot pump 351 under a pressure ranging from 15 to 20 MPa. The on-off valve 356 is now opened to deliver the adhesive 23 under pressure through the flexible hose 353 to the coating gun 31. The coating gun 31 discharges the adhesive 23 toward the peripheral edge portion 21a of the multilayer glass panel 21, coating the face surface of the peripheral edge portion 21a with a layer of adhesive 23. Simultaneously, the gear pump 32a is actuated by the servomotor 32b under control of the controller 36 to deliver the molding material 22 from the trochoidal pump 34a to the coating gun 31. The coating gun 31 discharges the molding material 22 toward the peripheral edge portion 21a of the multilayer glass panel 21, coating the surface of the peripheral edge portion 21a with a layer of molding material 22 over the layer of adhesive 23.

At this time, the head body 30 is moved in the direction indicated by the arrow X1 in FIG. 2 by the X-axis slide 263. The two layers of adhesive 23 and molding material 22 are thus continuously applied to the peripheral edge portion 21a of the multilayer glass panel 21 along an upper side thereof, as seen in FIG. 2, thereof, molding a glazing gasket 27 on the peripheral edge portion 21a along the upper side.

Similarly, while the coating gun 31 is discharging the adhesive 23 and the molding material 22, the X-axis slide 262 and the Y-axis slide 263 are moved to move the coating gun 31 in a square pattern over the peripheral edge portion 21a successively along left, lower, and right sides of the multilayer glass panel 21. In this manner, the glazing gasket 27 is continuously molded on the peripheral edge portion 21a of the face surface of the multilayer glass panel 21 along the four sides thereof.

If a glazing gasket 27 is to be molded on the peripheral edge portion 21a of the back surface of the multilayer glass panel 21, then after the glazing gasket 27 has been molded on the peripheral edge portion 21a of the face surface of the multilayer glass panel 21, the multilayer glass panel 21 is horizontally placed, positioned, and clamped on the worktable 260, with the back surface of the multilayer glass panel 21 facing upwardly to the head body 30. Thereafter, the glazing gasket 27 is molded on the peripheral edge portion 21a of the back surface of the multilayer glass panel 21 in the same manner as it is molded on the peripheral edge portion 21a of the face surface of the multilayer glass panel 21.

When the glazing gasket 27 has been molded on the peripheral edge portion 21a of the face and back surfaces of the multilayer glass panel 21 over its entire length, the on-off valve 356 is closed to prevent the adhesive 23, which is less viscous than the molding material, from being unduly expelled out of the coating gun 31 under the preloading pressure.

When the glazing gasket 27 is molded onto the peripheral edge portion 21a at a corner of the multilayer glass panel 21, the rate at which the corner is coated with the molding material 22 is lower than the rate at which the straight sides of the multilayer glass panel 21 are coated with the molding material 22. As a result, while the coating gun 31 is moving around the corner, the molding material 22 is discharged from the coating gun 31 at a rate lower than while the coating gun 31 is moving along the straight sides of the multilayer glass panel 21. Therefore, the rate at which the molding material 22 is supplied from the molding material feed pump 34 to the molding material discharge pump 32 becomes greater than the rate at which the molding material 22 is drawn from the flexible pressure-resistant hose 38 into the molding material discharge pump 32. The difference between these rates results in an excessive amount of molding material 22 circulating from the inlet end of the molding material discharge pump 32 through the flexible pressure-resistant circulation hose 39 back into the heating cylinder 33b of the extruding machine 33 near the outlet end 33d. It is thus possible to keep the pressure of the molding material 22 at the inlet end of the gear pump 32a at a constant level equal to or lower than 15 MPa, for example, and also to control highly accurately the rate at which the molding material 22 is discharged from the coating gun 31 in a variable-speed coating mode ranging from a high coating rate of 400 mm/sec, for example, to a low coating rate of 200 mm/sec.

According to the above illustrated embodiment, the molding material 22 extruded from the extruding machine 33 is supplied at a constant rate from the molding material feed pump 34 to the molding material discharge pump 32, which draws in and supplies the molding material 22 under a constant pressure to the coating gun 31. The coating gun 31 discharges the molding material to the peripheral edge portion 21a of the multilayer glass panel 21 to coat the peripheral edge portion 21a with the molding material. The rotational speed of the molding material discharge pump 32 is controlled depending on the relative speed between the multilayer glass panel 21 and the coating gun 31 which move relatively to each other while the glazing gasket molding apparatus is in operation, thereby adjusting the rate at which the molding material 22 is discharged from the coating gun 31. When the rate at which the molding material 22 is supplied from the molding material feed pump 34 to the molding material discharge pump 32 becomes greater than the rate at which the molding material 22 is drawn from the flexible pressure-resistant hose 38 into the molding material discharge pump 32, the difference between these rates results in an excessive amount of molding material 22 flowing from the inlet end of the molding material discharge pump 32 through the flexible pressure-resistant circulation hose 39 back into the heating cylinder 33b of the extruding machine 33 near the outlet end 33d. Even though the molding material 22 is highly viscous and compressible, and the flexible pressure-resistant hose 38 extending from the molding material feed pump 34 to the molding material discharge pump 32 is long, and even when the molding material discharge pump 32 is not in operation, the molding material 22 is caused to flow at all times from the molding material feed pump 34 toward the molding material discharge pump 32. Thus, the pressure of the molding material 22 at the inlet end of the molding material discharge pump 32 can be held at a constant level at all times, and the highly viscous molding material 22 can be applied at a high rate to the multilayer glass panel 21. Furthermore, inasmuch as the rotational speed of the molding material discharge pump 32 is controlled depending on the relative speed between the multilayer glass panel 21 and the coating gun 31, the rate at which the molding material 22 is discharged from the coating gun 31 can be adjusted highly accurately. Consequently, a glazing gasket 27 can be molded highly accurately to a constant thickness on the multilayer glass panel 21, and can also be molded automatically on the multilayer glass panel 21.

According to the above illustrated embodiment, moreover, as the adhesive 23 is applied to the multilayer glass panel 21 before the molding material 22 is applied to the multilayer glass panel 21, the glazing gasket molded on the multilayer glass panel 21 is highly resistant to peeling-off.

Moreover, the molding material feed pump 34 comprises the trochoidal pump 34a, and the molding material discharge pump 32 comprises the gear pump 32a. The trochoidal pump 34a and the gear pump 32a are connected to each other by the flexible pressure-resistant hose 38 with a built-in heater. The flexible pressure-resistant circulation hose 39 with a built-in heater provides a circulation path from the inlet end of the gear pump 32a to the extruding machine 33. These hoses 38, 39 are heated by the respective built-in heaters for heating and melting the molding material 22 flowing therein so that the molding material 22 can be applied to the multilayer glass panel 21 by the coating gun 31. Accordingly, the molding material 22 remain flowable in the hoses 38, 39. When the gear pump 32a is reduced or increased in rotational speed, the highly viscous molding material 22 is prevented from being delayed upon being supplied to the inlet end of the gear pump 32a, and the rate at which the molding material 22 is discharged from the coating gun 31 is easily controlled.

In the above illustrated embodiment, in order to hold the pressure of the molding material 22 at the inlet end of the gear pump 32a, part of the molding material 22 supplied from the molding material feed pump 34 to the molding material discharge pump 32 is caused to flow through the flexible pressure-resistant circulation hose 39 to the extruding machine 33 near the outlet end 33d. However, the inlet end of the molding material discharge pump 32 and the inlet end of the molding material feed pump 34 may be connected to each other by a flexible circulation hose indicated by two-dot-and-dash lines in FIG. 1.

The invention claimed is:

1. A method of molding a glazing gasket onto a multilayer glass panel by applying a molding material discharged from a coating gun as a layer of molding material to a peripheral edge portion of the multilayer glass panel while the multilayer glass panel and the coating gun are being moved relatively to each other along peripheral edge portion of the multilayer glass panel, comprising the steps of:
   providing a molding material discharge pump connected to said coating gun for discharging the molding material from said coating gun, an extruding machine for extruding the molding material, and a molding material feed pump for feeding the molding material extruded from said extruding machine to said molding material discharge pump;
   providing a circulation path connected between said molding material discharge pump and said extruding machine or between said molding material discharge pump and said molding material feed pump;
   feeding said molding material extruded from said extruding machine to said molding material discharge pump with said molding material feed pump;
   drawing said molding material into said molding material discharge pump, supplying said molding material from said molding material discharge pump to said coating gun under constant pressure, and adjusting the rate at which said molding material is discharged from said coating gun depending on the relative speed at which said multilayer glass panel and said coating gun are moved relatively to each other; and
   circulating an amount of molding material through said circulation path to said extruding machine or said molding material feed pump, said amount of molding material being commensurate with the difference between a first rate at which said molding material is fed from said molding material feed pump to said molding material discharge pump and a second rate at which said molding material is drawn into said molding material discharge pump when said first rate is greater than said second rate.

2. A method according to claim 1, wherein said rate at which said molding material is discharged from said coating gun is adjusted by controlling the rotational speed of said molding material discharge pump depending on the relative speed at which said multilayer glass panel and said coating gun are moved relatively to each other.

3. A method according to claim 2, further comprising the steps of:
   providing an adhesive supply mechanism for supplying an adhesive to said coating gun; and
   applying said adhesive supplied from said adhesive supply mechanism as a layer of adhesive to the peripheral edge portion of the multilayer glass panel in superposed relation to said layer of molding material applied to the peripheral edge portion of the multilayer glass panel.

4. A method according to claim 2, wherein said molding material feed pump comprises a trochoidal pump actuatable by a servomotor, and said molding material discharge pump comprises a gear pump actuatable by a servomotor.

5. A method according to claim 1, further comprising the steps of:
   providing an adhesive supply mechanism for supplying an adhesive to said coating gun; and
   applying said adhesive supplied from said adhesive supply mechanism as a layer of adhesive to the peripheral edge portion of the multilayer glass panel in superposed relation to said layer of molding material applied to the peripheral edge portion of the multilayer glass panel.

6. A method according to claim 5, wherein said molding material feed pump comprises a trochoidal pump actuatable by a servomotor, and said molding material discharge pump comprises a gear pump actuatable by a servomotor.

7. A method according to claim 1, wherein said molding material feed pump comprises a trochoidal pump actuatable by a servomotor, and said molding material discharge pump comprises a gear pump actuatable by a servomotor.

8. An apparatus for molding a glazing gasket onto a multilayer glass panel by applying a molding material discharged from a coating gun as a layer of molding material to a peripheral edge portion of the multilayer glass panel while the multilayer glass panel and the coating gun are being moved relatively to each other along peripheral edge portion of the multilayer glass panel, comprising:
- a molding material discharge pump connected to said coating gun for discharging the molding material from said coating gun;
- an extruding machine for extruding the molding material;
- a molding material feed pump for feeding the molding material extruded from said extruding machine to said molding material discharge pump;
- control means for adjusting the rate at which said molding material is discharged from said coating gun by controlling the rotational speed of said molding material discharge pump depending on the relative speed at which said multilayer glass panel and said coating gun are moved relatively to each other; and
- a circulation path connected between said molding material discharge pump and said extruding machine or between said molding material discharge pump and said molding material feed pump;
- wherein an amount of molding material is circulated through said circulation path to said extruding machine or said molding material feed pump, said amount of molding material being commensurate with the difference between a first rate at which said molding material is fed from said molding material feed pump to said molding material discharge pump and a second rate at which said molding material is drawn into said molding material discharge pump when said first rate is greater than said second rate.

9. An apparatus according to claim 8, further comprising:
an adhesive supply mechanism for supplying an adhesive to said coating gun;
wherein said coating gun applies said adhesive supplied from said adhesive supply mechanism as a layer of adhesive to the peripheral edge portion of the multilayer glass panel in superposed relation to said layer of molding material applied to the peripheral edge portion of the multilayer glass panel.

10. An apparatus according to claim 9, wherein said adhesive supply mechanism comprises:
a shot pump for supplying the adhesive to said coating gun to cause said coating gun to discharge said adhesive;
an adhesive supply pump for supplying said adhesive to said shot pump; and
a flexible hose interconnecting said coating gun and said shot pump, said flexible hose having a built-in heater for heating and melting the adhesive so that the adhesive can be applied to the peripheral edge portion of the multilayer glass panel by said coating gun.

11. An apparatus according to claim 10, wherein said molding material feed pump comprises a trochoidal pump actuatable by a servomotor, and said molding material discharge pump comprises a gear pump actuatable by a servomotor.

12. An apparatus according to claim 9, further comprising:
a flexible hose interconnecting said molding material feed pump and said molding material discharge pump, said flexible hose having a built-in heater for heating and melting the molding material fed from molding material feed pump to said molding material discharge pump so that the molding material can be applied to the peripheral edge portion of the multilayer glass panel by said coating gun.

13. An apparatus according to claim 9, wherein said circulation path comprises a flexible hose having a built-in heater for heating and melting the molding material circulated through said circulation path.

14. An apparatus according to claim 9, wherein said molding material feed pump comprises a trochoidal pump actuatable by a servomotor, and said molding material discharge pump comprises a gear pump actuatable by a servomotor.

15. An apparatus according to claim 8, further comprising:
a flexible hose interconnecting said molding material feed pump and said molding material discharge pump, said flexible hose having a built-in heater for heating and melting the molding material fed from molding material feed pump to said molding material discharge pump so that the molding material can be applied to the peripheral edge portion of the multilayer glass panel by said coating gun.

16. An apparatus according to claim 15, wherein said circulation path comprises a flexible hose having a built-in heater for heating and melting the molding material circulated through said circulation path.

17. An apparatus according to claim 15, wherein said molding material feed pump comprises a trochoidal pump actuatable by a servomotor, and said molding material discharge pump comprises a gear pump actuatable by a servomotor.

18. An apparatus according to claim 8, wherein said circulation path comprises a flexible hose having a built-in heater for heating and melting the molding material circulated through said circulation path.

19. An apparatus according to claim 18, wherein said molding material feed pump comprises a trochoidal pump actuatable by a servomotor, and said molding material discharge pump comprises a gear pump actuatable by a servomotor.

20. An apparatus according to claim 8, wherein said molding material feed pump comprises a trochoidal pump actuatable by a servomotor, and said molding material discharge pump comprises a gear pump actuatable by a servomotor.

* * * * *